(12) United States Patent  (10) Patent No.: US 11,537,640 B2
Imaida et al.  (45) Date of Patent: Dec. 27, 2022

(54) MAP OUTPUT DEVICE, MAP OUTPUT SYSTEM, AND COMPUTER-READABLE STORAGE MEDIUM INCLUDING PROGRAM

(71) Applicant: MICWARE CO., LTD., Kobe (JP)

(72) Inventors: Kenta Imaida, Kobe (JP); Takuma Segawa, Kobe (JP); Eishin Hirokawa, Kobe (JP)

(73) Assignee: MICWARE CO., LTD., Kobe (JP)

( * ) Notice: Subject to any disclaimer, the term of this patent is extended or adjusted under 35 U.S.C. 154(b) by 0 days.

(21) Appl. No.: 17/185,747

(22) Filed: Feb. 25, 2021

(65) Prior Publication Data

US 2021/0271696 A1    Sep. 2, 2021

Related U.S. Application Data

(60) Provisional application No. 62/982,178, filed on Feb. 27, 2020.

(51) Int. Cl.
*G06F 16/00* (2019.01)
*G06F 16/29* (2019.01)
*G06F 16/248* (2019.01)
*G06F 21/60* (2013.01)
*G06F 16/13* (2019.01)

(52) U.S. Cl.
CPC .............. *G06F 16/29* (2019.01); *G06F 16/13* (2019.01); *G06F 16/248* (2019.01); *G06F 21/602* (2013.01)

(58) Field of Classification Search
CPC ........ G06F 16/13; G06F 16/248; G06F 16/29; G06F 21/10; G06F 21/602; G06F 2221/0704; G06F 2221/0775; G06F 2221/2135
See application file for complete search history.

(56) References Cited

U.S. PATENT DOCUMENTS

| 2008/0244180 A1* | 10/2008 | Umemura | G01C 21/32 711/115 |
| 2012/0291134 A1* | 11/2012 | Masuda | H04L 63/0428 726/26 |
| 2015/0066366 A1* | 3/2015 | Pang | G06Q 20/14 701/532 |
| 2020/0342336 A1* | 10/2020 | Sugimoto | G08G 1/096894 |

FOREIGN PATENT DOCUMENTS

JP    2011-169825 A    9/2011

* cited by examiner

*Primary Examiner* — Dinku W Gebresenbet
(74) *Attorney, Agent, or Firm* — Foley & Lardner LLP

(57) ABSTRACT

A map output device is provided for preventing a storage medium from being sharedly used. The map output device comprises a connection unit; an output unit that outputs map data; and a control unit. The control unit is configured, when a storage medium is connected to the connection unit or when a movable body is used beyond a predetermined usage amount, to write a file containing information on a unique value related to the movable body into the storage medium connected to the connection unit, and to output, to the output unit, the map data read from the storage medium.

9 Claims, 7 Drawing Sheets

FIG. 2

| TYPE OF DATA | BEFORE BEING INSERTED FIRST INTO NAVIGATION DEVICE | AFTER BEING INSERTED INTO NAVIGATION DEVICE | AFTER VEHICLE LOCK | AFTER MAP UPDATE (VIA NAVIGATION DEVICE) | AFTER MAP UPDATE (VIA PC) |
|---|---|---|---|---|---|
| VEHICLE-SPECIFYING FILE | • VEHICLE-SPECIFYING VALUE (INITIAL VALUE)<br>• MEDIUM-SPECIFYING INFORMATION<br>• MAP VERSION | • VEHICLE-SPECIFYING VALUE (INITIAL VALUE)<br>• MEDIUM-SPECIFYING INFORMATION<br>• MAP VERSION | • VEHICLE-SPECIFYING VALUE (UNIQUE VALUE)<br>• MEDIUM-SPECIFYING INFORMATION<br>• MAP VERSION | • VEHICLE-SPECIFYING VALUE (UNIQUE VALUE)<br>• MEDIUM-SPECIFYING INFORMATION<br>• MAP VERSION | • VEHICLE-SPECIFYING VALUE (UNIQUE VALUE)<br>• MEDIUM-SPECIFYING INFORMATION<br>• MAP VERSION |
| LISENCE FILE | | • VEHICLE-SPECIFIC VALUE (INITIAL VALUE)<br>• MEDIUM-SPECIFYING INFORMATION<br>• MAP VERSION | • VEHICLE-SPECIFIC VALUE (UNIQUE VALUE)<br>• MEDIUM-SPECIFYING INFORMATION<br>• MAP VERSION | • VEHICLE-SPECIFIC VALUE (UNIQUE VALUE)<br>• MEDIUM-SPECIFYING INFORMATION<br>• MAP VERSION | • VEHICLE-SPECIFIC VALUE (UNIQUE VALUE)<br>• MEDIUM-SPECIFYING INFORMATION<br>• MAP VERSION |
| MAP DATA | MAP DATA | MAP DATA | MAP DATA | MAP DATA | MAP DATA |
| MAP DIFFERENCE DATA | | | | MAP DIFFERENCE DATA | |

MAP OUTPUT DEVICE, MAP OUTPUT SYSTEM, AND COMPUTER-READABLE STORAGE MEDIUM INCLUDING PROGRAM

CROSS-REFERENCE TO RELATED APPLICATIONS

This application claims the benefit under 35 U.S.C 119(e) of U.S. provisional application Ser. No. 62/982,178 filed Feb. 27, 2020, the disclosure of which is incorporated by reference in its entirety.

BACKGROUND OF THE INVENTION

Technical Field

The present invention relates to a map output device that outputs a map, a map output system, and a map output program.

Background Art

Conventionally, there have been techniques related to security of map data to be used in navigation systems, which are disclosed in e.g., JP 2011-169825 A.

The technique in JP 2011-169825 A discloses that, when a storage medium in which map data is stored is loaded in a navigation unit for the first time, the navigation unit reads update authority information required for updating the map data from the storage medium and then deletes this update authority information from the storage medium. Based on this update authority information, the navigation unit creates an update time limit for the map data and stores the created update time limit together with medium-identification information.

JP 2011-169825 A describes the technique in which the navigation system can update the map data by using the update authority information and the update time limit created from the update authority information, without the map data being illegally copied.

The navigation unit disclosed in JP 2011-169825 A, however, cannot prevent one storage medium from being sharedly used among two or more navigation systems.

SUMMARY OF THE INVENTION

An object of the present invention is to provide a map output device, a map output system, and a map output program, all of which can prevent a storage medium from being sharedly used.

A non-limiting first aspect of the present disclosure is a map output device mounted in a movable body, the device including: a connection unit to be connected to a storage medium in which map data is stored; an output unit that outputs the map data; and a control unit that individually controls the connection unit and the output unit. The control unit is configured, when the storage medium is connected to the connection unit or when the movable body is used beyond a predetermined usage amount, to write a file containing information on a unique value, the unique value being a character string, related to the movable body into the storage medium connected to the connection unit and to output, to the output unit, the map data read from the storage medium in which the file containing the information on the unique value related to the movable body is stored.

Since the map output device according to the first aspect is configured, when the storage medium is connected to the connection unit or when the movable body is used beyond a predetermined usage amount, to store a file containing information on a unique value related to the movable body into a storage medium and to read the map data from the storage medium, the storage medium from which the map data is to be read can be restricted. Therefore, since the map output device can be configured not to read map data from a storage medium used by other map output device, the storage medium can be prevented from being sharedly used.

In the map output device according to a second aspect of the present disclosure, the usage amount is obtained based on a length over which the movable body has moved or based on a period in which the map data is output to the output unit.

The map output device according to the second aspect can easily find the usage amount by the movable body.

In the map output device according to a third aspect of the present disclosure, the storage medium prestores a file containing information on an initial value, the initial value being any character string. The control unit is configured to read the map data also from the storage medium in which the file containing the information on the initial value is stored, and to, when the storage medium is connected to the connection unit or when the movable body is used beyond a predetermined usage amount, overwrite the file containing the information on the initial value stored in the storage medium with the file containing the information on the unique value.

The map output device according to the third aspect can simplify the process to read the map data from the storage medium by overwriting the file containing the information on the initial value with the file containing the information on the unique value.

In the map output device according to a fourth aspect of the present disclosure, each of the file containing the information on the initial value and the file containing the information on the unique value further contains version information indicating a version of the map data. The control unit is configured to, when the map data stored in the storage medium is updated, write, into the storage medium, a file containing the information on the initial value or the unique value and the version information on the updated map data.

The map output device according to the fourth aspect, even when map data is updated, can store information which coincides with the current status into the storage medium.

A non-limiting fifth aspect of the present disclosure is a map output system including a map output device mounted in a movable body and a server. The map output device includes: a connection unit to be connected to a storage medium in which map data is stored; an output unit that outputs the map data; and a control unit that individually controls the connection unit and the output unit. The control unit is configured, when the storage medium is connected to the connection unit or when the movable body is used beyond a predetermined usage amount, to write a file containing information on a unique value, the unique value being a character string, related to the movable body and version information indicating a version of the map data into the storage medium connected to the connection unit and to output, to the output unit, the map data read from the storage medium in which the file containing the information on the unique value and the version information is stored. The server is configured to, even when the map data stored in the storage medium is updated, create a file containing the version information on the updated map data and the information on the unique value.

Since the map output system according to the fifth aspect is configured to read map data from a storage medium into which a file containing information on a unique value related to the movable body is stored, the map output device can restrict the storage medium from which the map data is to be read. Therefore, since the map output system enables the map output device not to read map data from a storage medium used by other map output device, the storage medium can be prevented from being sharedly used. Additionally, even when map data is updated, the server can create a file containing information which coincides with the current status, and store into the storage medium.

In the map output system according to a sixth aspect of the present disclosure, the server further includes a storage unit that stores a predetermined encryption key. The server is configured to, when the map data stored in the storage medium is updated, encrypt the file containing the version information on the updated map data and the information on the unique value, based on the encryption key.

The map output system according to the sixth aspect need not store an encryption key into an update unit, e.g. a personal computer, and can guarantee a level of security.

In the map output system according to a seventh aspect of the present disclosure, the storage medium prestores a file containing information on an initial value, the initial value being any character string, and the version information. The control unit is configured to read the map data also from the storage medium in which the file containing the information on the initial value is stored. The server is configured to, when the map data stored in the storage medium is updated, create a file containing the version information on the updated map data and the information on the initial value.

The map output system according to the seventh aspect, even before a file containing information on a unique value is created, can prevent a storage medium from being sharedly used and update map data stored in a storage medium.

In the map output system according to an eighth aspect of the present disclosure, the storage medium prestores medium-specifying information for use in distinguishing the storage medium from other storage media. The control unit is configured to, when the storage medium is connected to the connection unit, write, into the storage medium, a license file containing the version information on the map data stored in the storage medium and the medium-specifying information. The server is configured to determine a time limit until which update of the map data stored in the storage medium is allowed, using the medium-specifying information and the version information contained in the license file.

The map output system according to the eighth aspect can appropriately update map data stored in the storage medium.

Effects of the Invention

According to the present invention, it is possible to prevent a storage medium from being sharedly used among two or more map output devices.

BRIEF DESCRIPTION OF THE DRAWINGS

FIG. 2 is a table listing types of data stored in an SD card for respective situations.

DETAILED DESCRIPTION OF THE PREFERRED EMBODIMENTS

Figure 1:
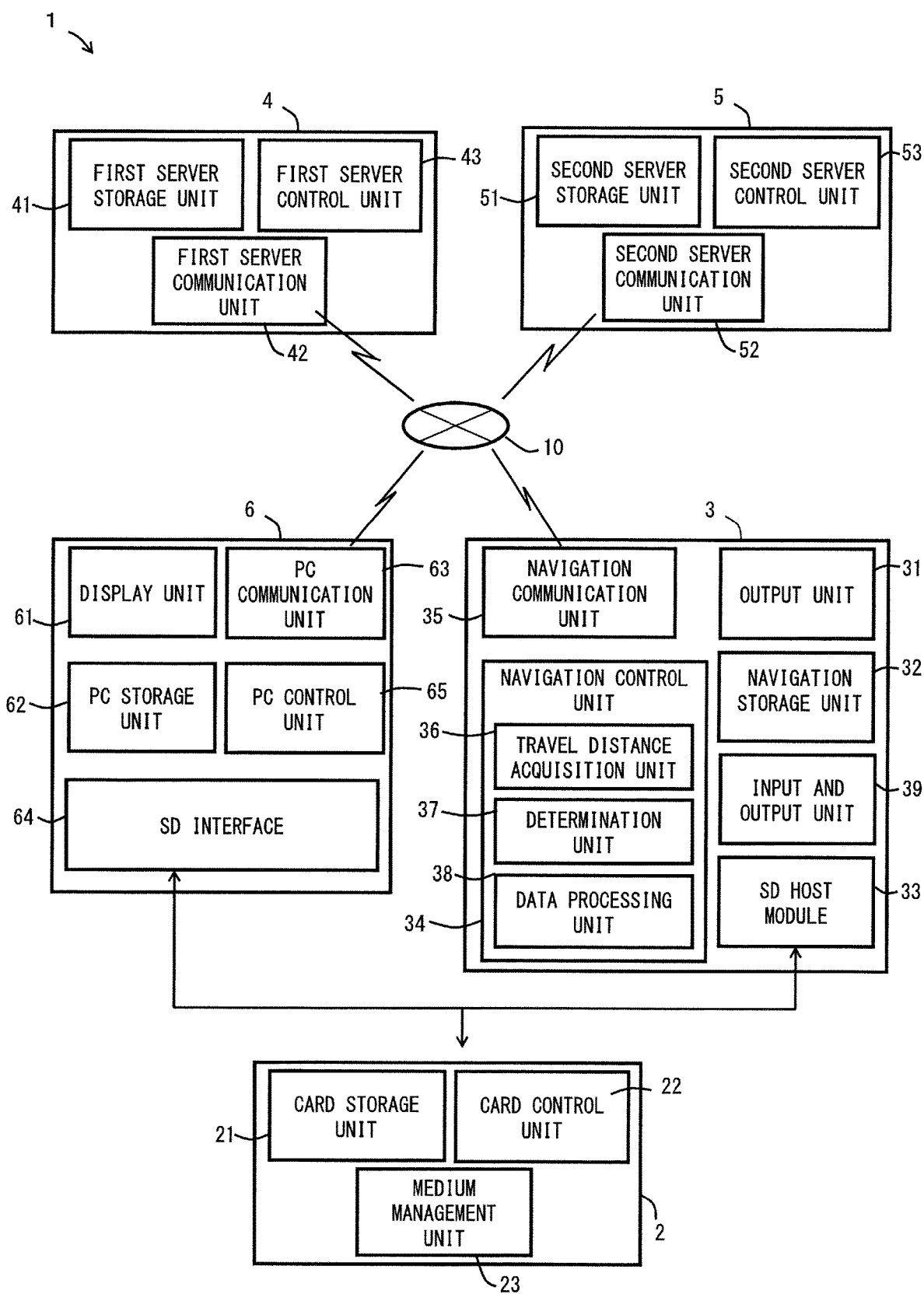
FIG. 1 is a configuration diagram illustrating a configuration of a map output system according to an embodiment of the present invention.

FIG. 1 is a configuration diagram illustrating a configuration of a map output system 1 according to an embodiment of the present invention. The map output system 1 in the present embodiment includes a secure digital (SD) card 2, a navigation device 3, a first server 4, a second server 5, and a personal computer 6.

As illustrated in FIG. 1, the SD card 2 includes a medium management unit 23, a card storage unit 21, and a card control unit 22. The SD card 2 corresponds to a storage medium.

As illustrated in FIG. 1, the navigation device 3 includes an output unit 31, a navigation storage unit 32, an input and output portion 39, an SD host module 33, a navigation control unit 34, and a navigation communication unit 35. The navigation device 3 corresponds to a map output device.

As illustrated in FIG. 1, the map output system 1 includes two servers: a first server 4 and a second server 5. In the present embodiment, the first server 4 is managed by one organization and the second server 5 is managed by another one. The first server 4 includes a first server storage unit 41, a first server communication unit 42, and a first server control unit 43. The second server 5 includes a second server storage unit 51, a second server communication unit 52, and a second server control unit 53.

The personal computer 6 includes a display unit 61, a PC storage unit 62, a PC communication unit 63, an SD interface 64, and a PC control unit 65. Hereinafter, the personal computer 6 is sometimes abbreviated as the PC 6.

Once the SD card 2 is inserted into the navigation device 3, the navigation device 3 is configured to read map data stored in the SD card 2 and to cause the output unit 31 to display a location of a vehicle equipped with the navigation device 3 and a route to a destination.

The SD card 2 is a genuine product. The genuine SD card 2 is, for example, an SD card 2 authorized by a manufacturer or distributor of the navigation device 3. The SD card 2 is sold either alone or together with the navigation device 3. Hereinafter, SD cards with no reference numerals indicate non-genuine SD cards. Examples of such non-genuine SD cards include commercially available SD cards.

In the present embodiment, when a non-genuine SD card is inserted, the navigation device 3 is configured not to read map data from this SD card or not to be activated.

The navigation device 3 is configured to be able to subject the inserted SD card 2 to a process of "vehicle lock", by which this SD card 2 is prohibited from being used in a navigation device 3 mounted in another vehicle even if both of the navigation devices 3 are the same model. Details on "vehicle lock" will be described later.

As described above, the map output system 1 is configured to enable the navigation device 3 to restrict SD cards 2 from which the map data is to be read and also prevent SD cards 2 from being sharedly used among two or more navigation devices 3.

<<Configuration of SD Card 2>>

The card control unit 22 individually controls the medium management unit 23 and the card storage unit 21.

The medium management unit 23 is a memory in which a user cannot rewrite data by using the PC 6 or the like. Basically, the SD card 2 is configured so that only the manufacturer can write data into the medium management unit 23.

The medium management unit 23 prestores medium-specifying information on the SD card 2 itself. The medium-specifying information is information for use in identifying the SD card 2. The medium-specifying information is set to information different from those of other SD cards 2. The medium-specifying information stored in the medium management unit 23 cannot be rewritten. The medium-specifying information partly contains specific information. The specific information is set, for example, in accordance with a type of navigation device 3 which the SD card 2 supports.

The card storage unit 21 is configured to store various types of information. In the present embodiment, the card storage unit 21 stores at least the map data, a vehicle-specifying file, and a license file. The vehicle-specifying file is a file for use in preventing shared use of the SD card 2. The license file is a file for use in managing a time limit until which the map data stored in the SD card 2 can be updated. Hereinafter, the time limit until which the map data stored in the SD card 2 can be updated is sometimes referred to as the update time limit.

The map data contains various types of information required to guide a route and display a map. The map data contains road information and facility information. The road information is indicated by a combination of nodes and links. The nodes are set, for example, at intersections or road ends. The links are set, for example, at locations where adjacent nodes are connected together. The facility information is information indicating buildings and points of interest (POIs). The newer the version of the map data, the more suitable for a current status its content is.

The map data is formed of data corresponding to a plurality of parcels, for example. The parcels are defined by dividing the ground surface into rectangles having a predetermined size based on latitude and longitude.

The map output system 1 is configured to be capable of updating the map data stored in the SD card 2. The map output system 1 updates the map data via the navigation device 3 or the PC 6. Hereinafter, the navigation device 3 is sometimes abbreviated as the navigation 3. Hereinafter, the update of the map data stored in the SD card 2 is also simply referred to as the map update.

The navigation device 3 is configured to automatically perform the map update. The navigation device 3 is configured to download map difference data from the first server 4 at a predetermined timing and to write the downloaded map difference data into the SD card 2. The map difference data is a part of the map data which is different from the map data of a previous version. The map difference data is acquired in parcel units, for example. The navigation device 3 can output, to the output unit 31, map data in which a part of the map data stored in the SD card 2 is updated by the map difference data. By using the map difference data for the map update, a time required for the map update can be shortened, compared to a case where the entire map data is downloaded.

The map update using the PC 6 is performed by the user with an update tool installed in the PC 6. The update tool is software dedicated to the map update. The update tool is programmed to download update map data from the second server 5 to the PC 6 and to overwrite the map data stored in the SD card 2 with this downloaded update map data.

The SD card 2 prestores the vehicle-specifying file. The vehicle-specifying file is encrypted and stored in the SD card 2.

FIG. 2 is a table indicating types of data stored in the SD card 2 for respective situations. As illustrated in FIG. 2, the vehicle-specifying file contains information on a vehicle-specifying value, medium-specifying information, and version information. The version information is information indicating a version of the map data. Hereinafter, the version of the map data is sometimes abbreviated as the map version. The version information contained in the vehicle-specifying file corresponds to the version information on the map data stored in the SD card 2.

The information on the vehicle-specifying value is related to the vehicle lock described above. The vehicle-specifying value is a predetermined character string. The character string contains at least one of numbers, characters, and symbols, for example. The information on the same vehicle-specifying value is prestored in two or more genuine SD cards 2. In other words, regular SD cards 2 supported by the navigation device 3 prestore the vehicle-specifying file containing the information on the same vehicle-specifying value. Hereinafter, the same vehicle-specifying value in two or more genuine SD cards 2 is sometimes referred to as the initial value.

The navigation control unit 34 is configured to, in a case where a vehicle equipped with the navigation device 3 travels over a predetermined travel distance, change the information on the vehicle-specifying value contained in the vehicle-specifying file from the information on the initial value into information on a unique value. The navigation control unit 34 sets the unique value based on the vehicle-specifying information. The vehicle-specifying information is intrinsic, unique information that each vehicle has and differently assigned to individual vehicles. The navigation control unit 34 creates the information on the unique value, based on the vehicle-specifying information and in accordance with hashing, for example. As a result, the unique value becomes a character string that differs depending on a vehicle. A process of changing the information on the initial value contained in the vehicle-specifying file into the information on the unique value is the vehicle lock. By changing the information on the vehicle-specifying value from the information on the initial value to the information on the unique value, the SD card 2 is linked to a specific vehicle. After the SD card 2 is subjected to the vehicle lock, the SD card 2 can be used only in the navigation device 3 mounted in the linked vehicle.

Herein, the travel distance corresponds to the usage amount. The usage amount is a parameter indicating how much the vehicle has been used. A case where the vehicle has traveled beyond the predetermined travel distance corresponds to a case where the vehicle has been used beyond the predetermined usage amount.

The vehicle-specifying file as described above is used as a file for restricting the SD card 2 from which the navigation device 3 reads the map data and preventing the SD card 2 from being sharedly used.

The license file is stored in the SD card 2. As illustrated in FIG. 2, the license file indicates information on the vehicle-specifying value, the medium-specifying information, and the version information. The navigation control unit 34 is configured to, when the SD card 2 is inserted into the SD host module 33, create the license file and to store the created license file in the SD card 2. The license file is encrypted and stored in the SD card 2.

<<Configuration of Navigation Device 3>>

The navigation device 3 is configured to guide a route, based on the map data read from the SD card 2. The navigation device 3 is connected to various car navigation sensors and input and output devices provided in the vehicle via the input and output portion 39. Examples of the car navigation sensors include a global positioning system (GPS) receiver, a direction sensor, and a distance sensor. The GPS receiver receives a GPS signal from a GPS satellite. The direction sensor detects an advancing direction of the vehicle or a change in the advancing direction. The distance sensor detects a speed and travel distance of the vehicle. The navigation device 3 is configured to be capable of performing processes, such as the route guidance and the vehicle lock, by using the data acquired via the input and output portion 39.

The output unit 31 displays a map based on the map data. The output unit 31 is implemented by a liquid crystal display (LCD), for example.

The navigation storage unit 32 is configured to store various types of information. In the present embodiment, the navigation storage unit 32 stores at least predetermined encryption keys, information on an initial value, and programs.

The predetermined encryption keys are an encryption key for use in encrypting and decrypting the vehicle-specifying file and an encryption key for use in encrypting and decrypting the license file.

The programs are various programs to be executed by the navigation device 3. Examples of those programs include a program for use in activating the navigation device 3, a program for use in updating the map, and a program for use in reading the medium-specifying information from the medium management unit 23.

The navigation storage unit 32 is implemented by a storage device. Examples of the storage device include a semiconductor memory device, such as RAM or flash memory, a hard disk, and an optical disk.

The input and output portion 39 inputs and outputs data between the vehicle and the navigation device 3. The input and output portion 39 is implemented by an input and output (I/O) interface.

The SD host module 33 is a device that exchanges data between the navigation device 3 and the SD card 2. The SD host module 33 is configured to accommodate the SD card 2. The SD host module 33 corresponds to a connection unit to which the SD card 2 is connected.

The navigation control unit 34 controls individual devices provided in the navigation device 3. The navigation control unit 34 includes a travel distance acquiring unit 36, a judging unit 37, and a data processing unit 38.

The travel distance acquiring unit 36 controls the input and output portion 39 so as to acquire travel distance information from the distance sensor provided in the vehicle. The travel distance information is information indicating the travel distance of the vehicle. The travel distance refers to a total distance over which the vehicle has traveled since it was unused.

The judging unit 37 makes various judgements when the map data is read from the SD card 2 inserted into the SD host module 33.

More specifically, the judging unit 37 judges whether the vehicle-specifying file is stored in the SD card 2. When judging that the vehicle-specifying file is not stored in the SD card 2, the judging unit 37 does not activate the navigation device 3. In short, the authentication fails if a non-genuine SD card in which the vehicle-specifying file is not stored is used.

Then, the judging unit 37 judges whether the vehicle-specifying file read from the SD card 2 is proper. More specifically, before the vehicle lock is performed, the judging unit 37 judges whether the information on the initial value contained in the vehicle-specifying file coincides with the information on the initial value stored in the navigation storage unit 32. After the vehicle lock is performed, the judging unit 37 judges whether the information on the unique value contained in the vehicle-specifying file coincides with the information on the character string created based on the vehicle-specifying information. In this case, the judging unit 37 acquires the vehicle-specifying information from the vehicle via the input and output portion 39. Then, the judging unit 37 judges whether the medium-specifying information contained in the vehicle-specifying file coincides with the medium-specifying information stored in the medium management unit 23. Furthermore, the judging unit 37 judges whether the version information contained in the vehicle-specifying file coincides with the version information of the map data stored in the SD card 2.

When judging that the vehicle-specifying file is not proper, the judging unit 37 does not activate the navigation device 3. In which case, the authentication of the vehicle-specifying file fails.

Similarly to general SD cards distributed in the market, the SD card 2 in the present embodiment can exchange data with the PC 6. Therefore, the map data and the like stored in the genuine SD card 2 may be illegally copied to another genuine SD card 2 or a commercially available SD card via the PC 6. However, if the vehicle-specifying file is illegally copied, at least one of the information on the initial value, the information on the unique value, the medium-specifying information, and the version information in this vehicle-specifying file is not matched with information stored in or created by the navigation device 3 or information stored in the SD card. Therefore, the navigation device 3 can prevent illegally copied genuine SD cards 2 or commercially available SD cards from being used.

Furthermore, since the navigation device 3 does not read the map data from the SD card 2 that has been used in another vehicle and related to another vehicle, the SD card 2 can be prevented from being sharedly used in another navigation device 3.

The judging unit 37 judges whether the content of data contained in the license file that has been read from the SD card 2 coincides with the current status. This judgement is made by, for example, based on at least one of the information on the initial value stored in the navigation storage unit 32, the vehicle-specifying information acquired via the input and output portion 39, the medium-specifying information stored in the medium management unit 23, and the map data stored in the SD card 2.

When making various judgements as described above, the judging unit 37 individually decrypts the license file and the vehicle-specifying file, based on the encryption keys stored in the navigation storage unit 32.

The data processing unit 38 performs various processes, based on the result of the judgements made by the judging unit 37 and the travel distance of the vehicle, for example.

More specifically, when the judging unit 37 judges that the content of the data contained in the license file does not coincide with the current status, the data processing unit 38 creates a new license file. For example, the data processing unit 38 creates the license file, based on at least one of the information on the initial value stored in the navigation storage unit 32, the vehicle-specifying information acquired via the input and output portion 39, the medium-specifying information stored in the medium management unit 23, and the map data stored in the SD card 2. Thereafter, the data processing unit 38 overwrites the license file stored in the SD card 2 with the newly created license file. As a result, the license file is maintained such that the content of the data contained in the license file coincides with the current status. In this way, the map output system 1 can update the map appropriately.

To activate the navigation device 3, the data processing unit 38 reads the map data from the SD card 2 in which the vehicle-specifying file has been successfully authenticated and causes the output unit 31 to output the map data.

The data processing unit 38 performs the vehicle lock. More specifically, when judging that the travel distance information acquired by the travel distance acquiring unit 36 exceeds a predetermined value, the data processing unit 38 creates a new vehicle-specifying file. The vehicle-specifying file newly created by the data processing unit 38 is a file that contains information on the unique value. The data processing unit 38 overwrites the vehicle-specifying file stored in the SD card 2 with the newly created vehicle-specifying file. The data processing unit 38 defines the unique value, based on the vehicle-specifying information acquired via the input and output portion 39. As a result, when the vehicle has traveled beyond the predetermined travel distance, the SD card 2 stores the vehicle-specifying file containing the information on the unique value related to the vehicle. However, the predetermined value is not limited to a specific value; as an example, it is defined as a value in a range of 10 km or more and 30 km or less. Alternatively, for example, the predetermined value is defined as a value in a range of 30 km or more and 50 km or less. Alternatively, for example, the predetermined value is defined as a value in a range of 50 km or more and 100 km or less. Alternatively, for example, the predetermined value is set to a value in a range of 100 km or more and 200 km or less.

After the vehicle has traveled beyond the predetermined travel distance, the data processing unit 38 performs the process of the vehicle lock whenever a genuine SD card 2 that has not been subjected to the vehicle lock is inserted.

The data processing unit 38 judges whether the SD card 2 has been subjected to the vehicle lock, based on the vehicle-specifying file.

Upon the map update, the data processing unit 38 requests the latest version from the first server 4. Further, when requesting the latest version, the data processing unit 38 controls the navigation communication unit 35 so as to transmit, to the first server 4, the version information on the map data stored in the SD card 2 and the medium-specifying information on the SD card 2. Then, after requesting the latest version, the data processing unit 38 controls the navigation communication unit 35 so as to receive the latest version of the map difference data from the first server 4. When receiving the map difference data, the data processing unit 38 creates a new vehicle-specifying file. This vehicle-specifying file is a file whose version information has been updated based on the map difference data acquired from the first server 4. The data processing unit 38 overwrites the vehicle-specifying file stored in the SD card 2 with the newly created vehicle-specifying file. Then, the data processing unit 38 stores the map difference data received from the first server 4 in the SD card 2.

When creating a new license file or vehicle-specifying file, the data processing unit 38 encrypts this file, based on a corresponding one of encryption keys stored in the navigation storage unit 32.

The navigation control unit 34 is implemented, for example, by a central processing unit (CPU), a micro processing unit (MPU), or the like executing programs stored in the navigation storage unit 32.

The navigation communication unit 35 communicates with the first server 4 via Internet 10. In the present embodiment, the navigation communication unit 35 is implemented by a telecommunication control unit (TCU).

<<Configuration of First Server 4>>

The first server storage unit 41 stores predetermined encryption keys, a map database, map difference data, and programs. The predetermined encryption keys are an encryption key related to the vehicle-specifying file and an encryption key related to the license file. The programs are various programs to be executed by the first server 4. The first server storage unit 41 stores two or more pieces of map difference data with different map versions. The map difference data stored in the first server storage unit 41 is updated to a new version of the map difference data, for example, several times a year by an organization that manages the first server 4.

The map database is used to manage the update time limit of the map data stored in the SD card 2. In the map database, the medium-specifying information, information on the update time limit, and the version information are stored in relation to one another. This version information indicates the version of the map data stored in the SD card 2.

The first server storage unit 41 is implemented by a storage device. Examples of the storage device include a semiconductor memory device, such as RAM or flash memory, a hard disk, and an optical disk. The first server storage unit 41 stores various types of information.

The first server communication unit 42 individually communicates with the navigation device 3 and the PC 6 via the Internet 10.

The first server control unit 43 individually controls the first server storage unit 41 and the first server communication unit 42, making various judgements and performing processes related to the map update.

When the map update starts, the first server control unit 43 verifies the license file transmitted from the navigation device 3 or the PC 6. The verification is performed by confirming that the license file can be decrypted and that the medium-specifying information contained in the license file contains the above specific information. The decryption of the license file is based on an encryption key stored in the first server storage unit 41. If the license file is not authenticated, the first server control unit 43 stops the update process.

After verifying the license file, the first server control unit 43 judges whether update authority is assigned to the SD card 2 related to the medium-specifying information contained in the license file. The update authority is authority to update the map data stored in the SD card 2. The update authority is assigned to each SD card 2. In addition, using medium-specifying information and version information contained in a license file, and, medium-specifying information, information on an update time limit, and version information contained in the map database, the first server control unit 43 determines a time limit until which update of map data stored in a SD card 2 is allowed.

When the medium-specifying information, the information on the update time limit, and the version information are registered in the map database, the first server control unit 43 judges that the update authority is assigned to the SD card 2 related to the medium-specifying information.

When the update authority is assigned, the first server control unit 43 judges whether the map data stored in the SD card 2 can be updated, based on the map database and the license file. That is, comparing the version information contained in the map database and the version information contained in the license file, if the version information contained in the license file is older and the time limit contained in the map database has not expired, the first server control unit 43 judges that map data could be updated. If the update time limit has already been passed, the first server control unit 43 stops the update process.

If the update authority is not assigned, the first server control unit 43 determines, based on the license file, an update time limit of the map data stored in the SD card 2 as a target, to which the update authority is to be assigned. For example, the first server control unit 43 defines, as the update time limit, a date when a predetermined number of years have passed from the present date. The first server control unit 43 reflects the determined update time limit in the map database together with the medium-specifying information and the version information on the target SD card 2.

When the license file is authenticated, the first server control unit 43 creates authentication information. The authentication information is used as information that certifies that the navigation device 3 or the PC 6 has successfully accessed the first server 4. The authentication information is expressed as a character string having no special meaning. The authentication information is defined so as to be usable over a predetermined period that has taken for one map update since the time of creation. The predetermined time is, for example, 12 hours or 24 hours. The authentication information is transmitted between the first server 4 and the navigation device 3 or between the first server 4 and the PC 6, together with various types of information. Using the authentication information eliminates the need for the map output system 1 to perform processes, such as transmission and decryption of the license file for each access. This can reduce a process load on the map output system 1 while taking security measures.

Upon the map update using the navigation device 3, the first server control unit 43 determines which of two or more pieces of map difference data downloadably stored in the first server storage unit 41 is the latest one, and then designates the version of the determined map difference data as the latest map version.

Upon the map update using the PC 6, when receiving a request to issue a vehicle-specifying file from the PC 6, the first server control unit 43 creates a new vehicle-specifying file, based on the version information on the map data that has been downloaded from the second server 5 to the PC 6. The first server control unit 43 acquires this version information from the PC 6. The created vehicle-specifying file contains this version information.

When creating the vehicle-specifying file, the first server control unit 43 encrypts the vehicle-specifying file, based on the corresponding encryption key stored in the first server storage unit 41.

When the map is updated, the first server control unit 43 updates the version information stored in the map database.

The first server control unit 43 is implemented, for example, by a CPU, a micro processing unit (MPU), or the like executing a program stored in the first server storage unit 41.

<<Configuration of Second Server 5>>

The second server 5 has substantially the same configuration as the first server 4, and a description of the same configuration will be omitted. The second server 5 is used for the map update using the PC 6 and thus not used for the map update using the navigation device 3.

The second server 5 differs in configuration from the first server 4 in that the update map data is stored in the second server storage unit 51. Furthermore, the second server 5 differs from the first server 4 in that the predetermined encryption keys, the map database, and the map difference data are not stored in the second server storage unit 51. The map data stored in the second server storage unit 51 is updated to a new version of the map data, for example, several times a year by an organization that manages the second server 5.

Upon the map update, when receiving version information transmitted from the PC 6, the second server control unit 53 is configured to transmit the update map data to the PC 6 in relation to the version information. The version information transmitted from the PC 6 is information indicating the latest one of versions of the pieces of map data that can be downloaded from the second server 5 to the PC 6.

<<Configuration of PC 6>>

PC 6 corresponds to an update unit. However, the present embodiment is not limited to a configuration in which the PC 6 is used as the update unit; alternatively, a smartphone, a tablet terminal or other similar device may be used as the update unit.

For example, the display unit 61 is implemented by an LCD.

The PC storage unit 62 stores various programs and the like. Examples of those programs include: an update tool program; programs necessary for processes to be performed by the PC 6; and a program for use in reading the medium-specifying information from the medium management unit 23.

The PC communication unit 63 individually communicates with the first server 4 and the second server 5 via Internet 10.

The SD interface 64 is a device that exchanges data between the PC 6 and the SD card 2. The SD interface 64 is configured to accommodate the SD card 2.

The PC control unit 65 individually controls the PC storage unit 62, the PC communication unit 63, and the SD interface 64. Upon the map update, the PC control unit 65 determines which of pieces of update map data downloadably stored in the second server storage unit 51 is the latest one, and then designates the version of the determined update map data as the latest map version. On this determination, the PC control unit 65 may acquire information for determining as the latest map version from the first server 4, the second sever 5 or any other sever. Based on the designated version, the PC control unit 65 controls the PC communication unit 63 so as to transmit the version information to the second server 5. Further, the PC control unit 65 controls the PC communication unit 63 so as to receive the update map data from the second server 5. The PC control unit 65 may be configured to be able to acquire information necessary for the version determination from at least one of the first server 4 and the second server 5.

When receiving the update map data, the PC control unit 65 requests the first server 4 to issue the vehicle-specifying file. The request to issue the vehicle-specifying file is a process of requesting to transmit the vehicle-specifying file in relation to the updated map data. When making the request to issue the vehicle-specifying file, the PC control unit 65 controls the PC communication unit 63 so as to transmit the version information on the update map data to the first server 4 and also controls the PC communication unit 63 so as to receive the vehicle-specifying file from the first server 4.

The PC control unit 65 is implemented, for example, by a CPU, an MPU, or the like executing a program stored in the PC storage unit 62.

<<Type of Data Stored in SD Card 2 in Each Situation>>

According to the map output system 1 in the present embodiment, as described above, various types of data are exchanged between the navigation device 3 and the SD card 2 or between the PC 6 and the SD card 2. As a result, the data stored in the SD card 2 is changed depending on the situation.

Before being inserted into the navigation device 3 for the first time, the SD card 2 stores a vehicle-specifying file and map data, as illustrated in FIG. 2. In this situation, information on a vehicle-specifying value contained in the vehicle-specifying file is information on an initial value.

When the SD card 2 is inserted into the navigation device 3 for the first time, the SD card 2 stores a new license file.

After the vehicle lock, the SD card 2 stores a vehicle-specifying file containing information on a unique value, instead of the vehicle-specifying file containing the information on the initial value. As a result, the SD card 2 stores the information on the vehicle-specifying value uniquely assigned to a vehicle. Then, the SD card 2 stores a license file containing information on the unique value, instead of the license file containing information on the initial value.

After the map update is performed via the navigation device 3, the SD card 2 stores new map difference data. Then, the SD card 2 stores a vehicle-specifying file and a license file that contain version information in relation to the map difference data.

After the map update is performed via the PC 6, the SD card 2 stores the update map data, instead of the originally stored map data. Then, the SD card 2 stores a vehicle-specifying file and a license file that contain version information in relation to the update map data.

<<Process of Activating Navigation Device 3>>

Figure 3:
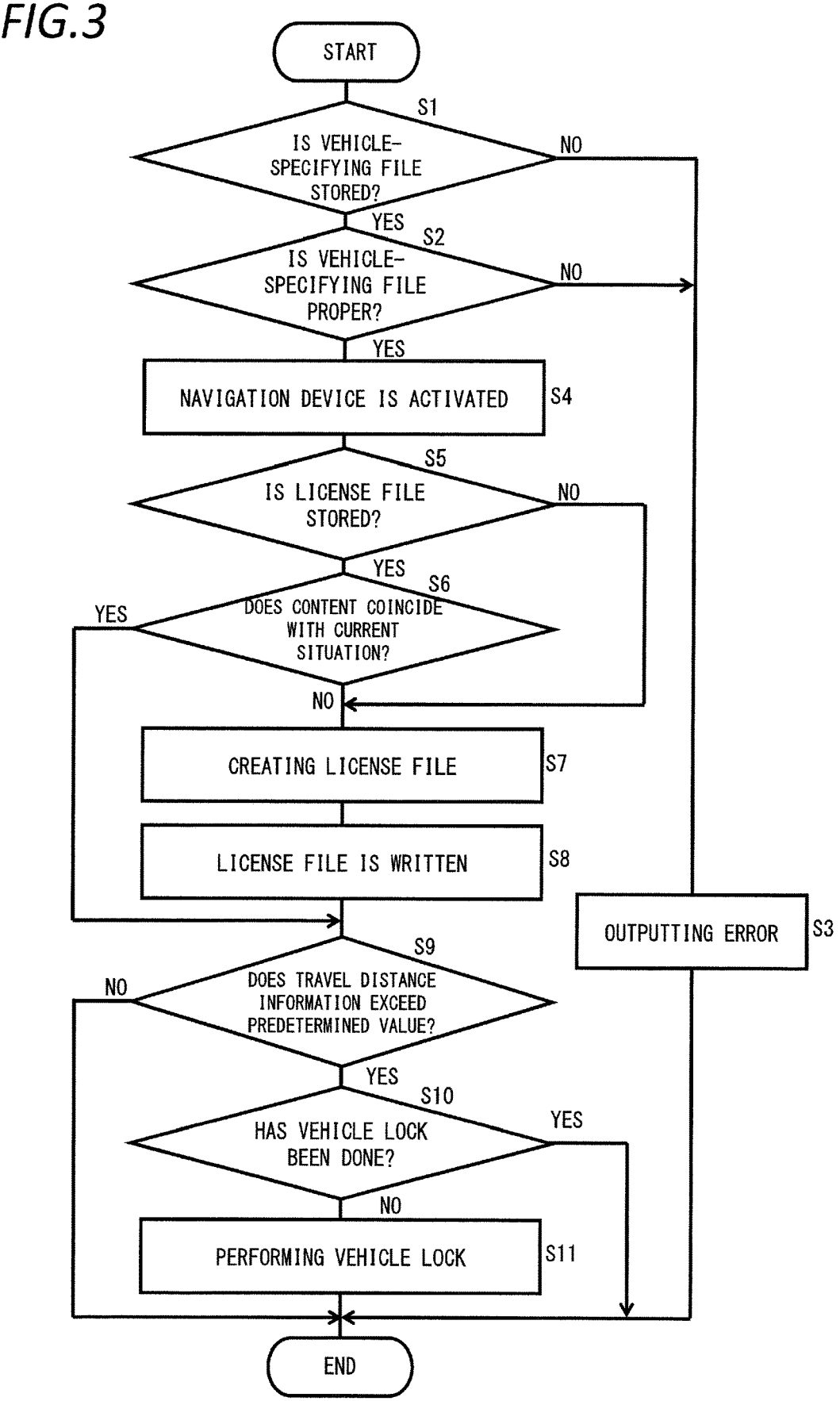
FIG. 3 is a flowchart of a process of activating a navigation device.

FIG. 3 is a flowchart of a process of activating the navigation device 3. The activation process starts in response to the insertion of the SD card 2 into the navigation device 3 and the supply of electric power to the navigation device 3.

In step S1, the judging unit 37 judges whether a vehicle-specifying file is stored in the SD card 2. When it is judged that the vehicle-specifying file is stored, the activation process proceeds to step S2. When it is not judged that the vehicle-specifying file is stored, the activation process proceeds to step S3.

In step S2, the judging unit 37 judges whether the vehicle-specifying file is proper. When it is judged that the vehicle-specifying file is proper, the activation process proceeds to step S4. When it is not judged that the vehicle-specifying file is proper, the activation process proceeds to step S3.

In step S3, the navigation device 3 judges that the inserted SD card 2 is in error and terminates the activation process.

In step S4, the navigation device 3 is activated.

In step S5, the judging unit 37 judges whether a license file is stored in the SD card 2. When it is judged that the license file is stored, the activation process proceeds to step S6. When it is not judged that the license file is stored, the activation process proceeds to step S7.

In step S6, the data processing unit 38 judges whether the content of the data contained in the license file coincides with the current status. When it is judged that the content of the data coincides with the current status, the activation process proceeds to step S9. When it is not judged that the content of the data coincides with the current status, the activation process proceeds to step S7.

In step S7, the data processing unit 38 creates a license file.

In step S8, the data processing unit 38 writes the license file created in step S7 into the SD card 2. If any license file is already stored in the SD card 2, the data processing unit 38 overwrites the license file stored in the SD card 2 with the license file created in step S7.

In step S9, the data processing unit 38 judges whether travel distance information exceeds a predetermined value. When it is judged that the travel distance information exceeds the predetermined value, the activation process proceeds to step S10. When it is not judged that the travel distance information exceeds the predetermined value, the navigation function becomes available, and the activation process ends.

In step S10, the data processing unit 38 judges whether the SD card 2 has been subjected to the vehicle lock. When it is judged that the SD card 2 has been subjected to the vehicle lock, the navigation function becomes available, and the activation process ends. When it is not judged that the SD card 2 has been subjected to the vehicle lock, the activation process proceeds to step S11.

In step S11, the data processing unit 38 performs the vehicle lock. Then, the navigation function becomes available, and the activation process ends.

<<Process of Updating Map Data with Navigation Device 3>>

Figure 4:
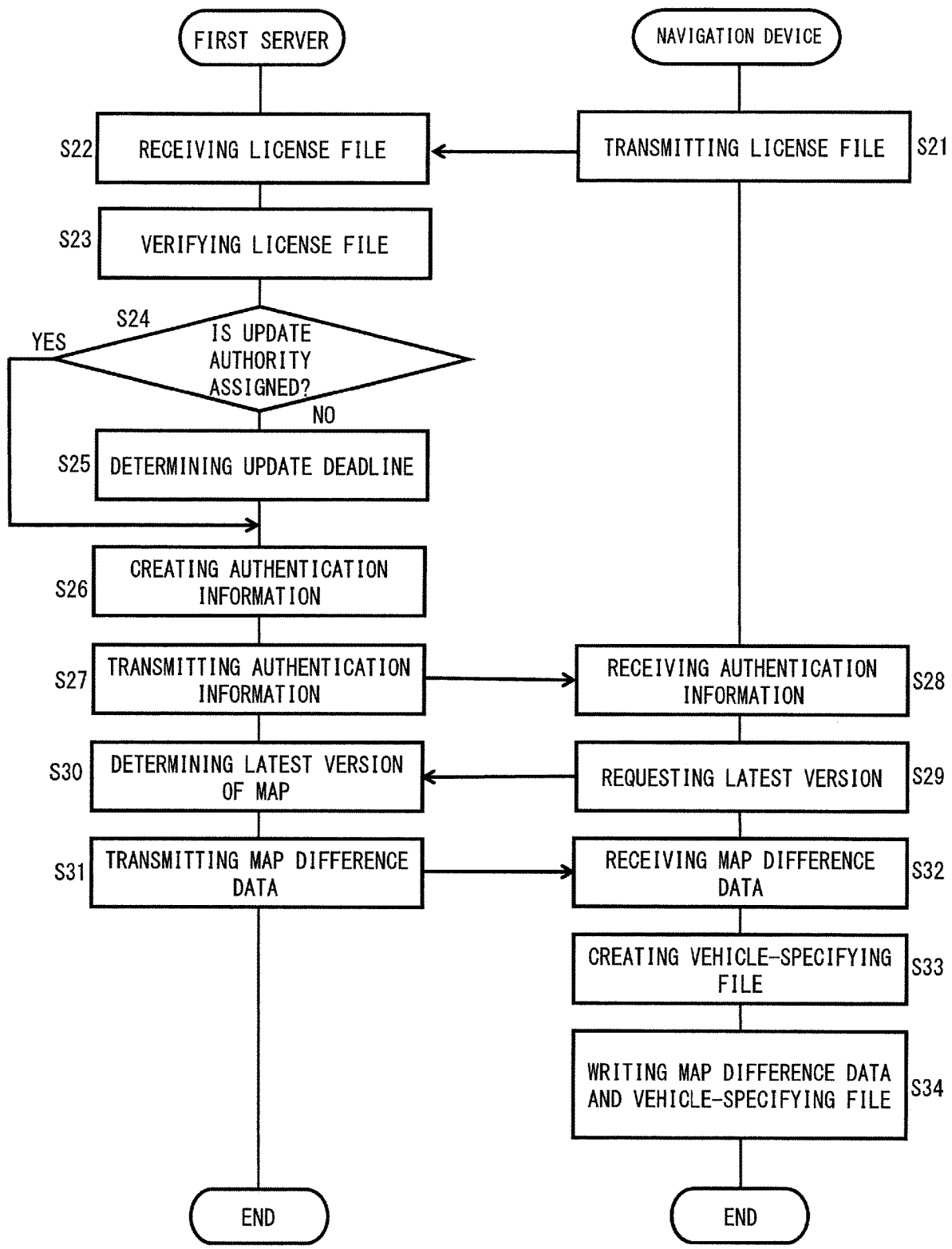
FIG. 4 is a flowchart of a process of updating map data with the navigation device.

FIG. 4 is a flowchart of a process of updating map data with the navigation device 3. The navigation device 3 starts the update process at a predetermined timing.

In step S21, the navigation control unit 34 controls the navigation communication unit 35 so as to transmit a license file to the first server 4.

In step S22, the first server control unit 43 controls the first server communication unit 42 so as to receive the license file.

In step S23, the first server control unit 43 verifies the license file.

In step S24, the first server control unit 43 judges whether update authority is assigned to the SD card 2 related to the license file received in step S23. When it is judged that the update authority is assigned, the update process proceeds to step S26. When it is not judged that the update authority is assigned, the process proceeds to step S25.

In step S25, the first server control unit 43 determines an update time limit of the map data in the SD card 2 to which the update authority has not been assigned in step S24, based on the license file received in step S23.

In step S26, the first server control unit 43 creates authentication information.

In step S27, the first server control unit 43 controls the first server communication unit 42 so as to transmit the authentication information created in step S26 to the navigation device 3.

In step S28, the navigation control unit 34 controls the navigation communication unit 35 so as to receive the authentication information.

In step S29, the navigation control unit 34 requests the latest version. Further, when requesting the latest version, the navigation control unit 34 transmits the authentication information received in step S28 to the first server 4, together with version information on the map data and medium-specifying information stored in the SD card 2.

In step S30, the first server control unit 43 determines the latest map version, based on map difference data stored in the first server storage unit 41.

In step S31, the first server control unit 43 controls the first server communication unit 42 so as to transmit map difference data to the navigation device 3, together with the authentication information created in step S26. The map difference data to be transmitted is related to the map version determined in step S30.

In step S32, the navigation control unit 34 controls the navigation communication unit 35 so as to receive the map difference data and the authentication information.

In step S33, the data processing unit 38 creates a vehicle-specifying file.

In step S34, the data processing unit 38 controls the SD host module 33 so as to write the map difference data received in step S32 and the vehicle-specifying file created in step S33 into the SD card 2. Then, the update process using the navigation device 3 ends.

<<Process of Updating Map Data with PC 6>>

Figure 5:
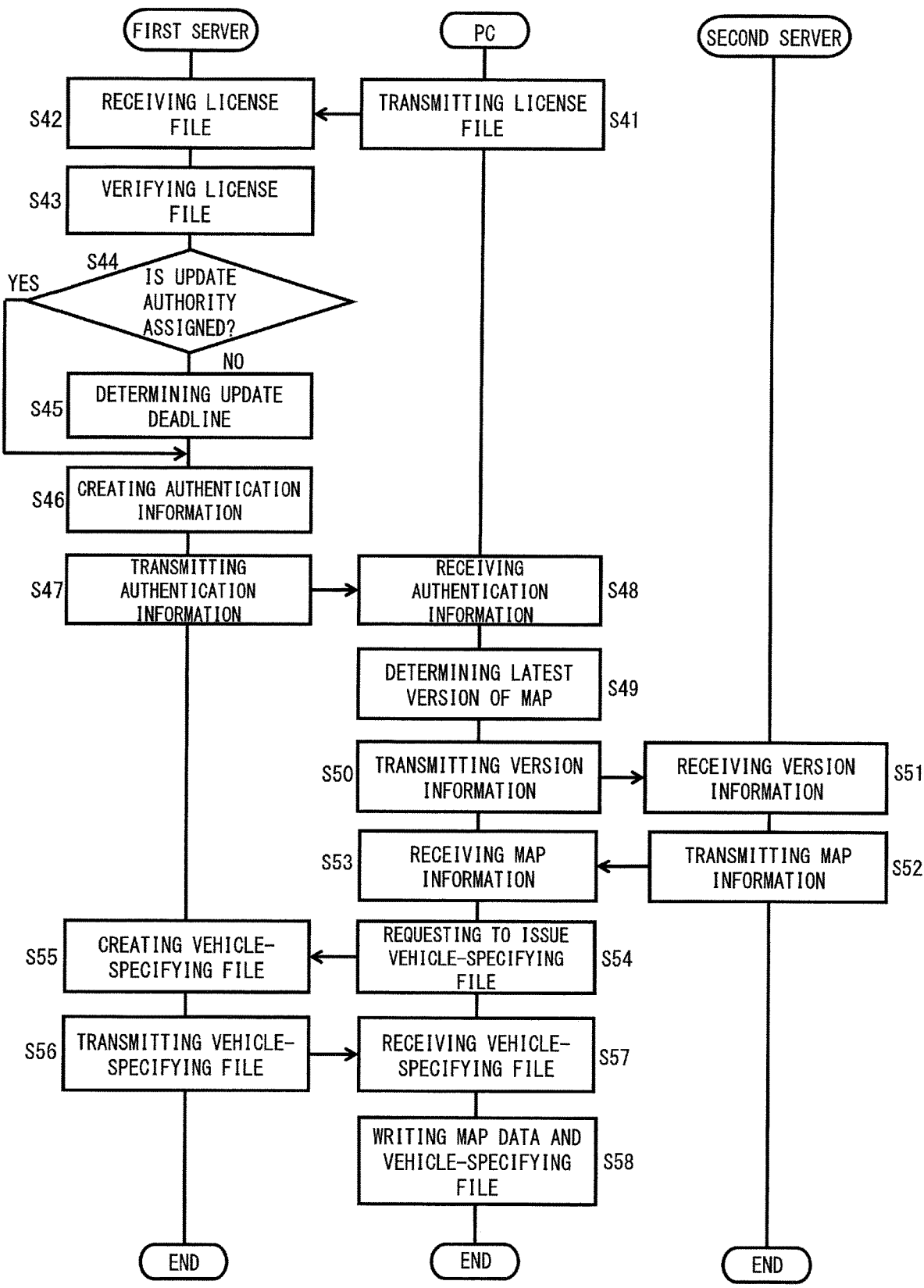
FIG. 5 is a flowchart of a process of updating the map data with a personal computer (PC).

FIG. 5 is a flowchart of a process of updating the map data with the PC 6. The update process using the PC 6 is started by a user at any given timing.

In step S41, the PC control unit 65 controls the PC communication unit 63 so as to transmit a license file to the first server 4.

The processes in steps S42 to S46 are the same as those in steps S22 to S26 illustrated in FIG. 4.

In step S47, the first server control unit 43 controls the first server communication unit 42 so as to transmit the authentication information created in step S46 to the PC 6.

In step S48, the PC control unit 65 controls the PC communication unit 63 so as to receive the authentication information.

In step S49, the PC control unit 65 determines the latest map version.

In step S50, the PC control unit 65 controls the PC communication unit 63 so as to transmit the version information determined in step S49 to the second server 5.

In step S51, the second server control unit 53 controls the second server communication unit 52 so as to receive the version information.

In step S52, the second server control unit 53 controls the second server communication unit 52 so as to transmit update map data to the PC 6. The map data to be transmitted is related to the version information received in step S51.

In step S53, the PC control unit 65 controls the PC communication unit 63 so as to receive the update map data.

In step S54, the PC control unit 65 makes a request to issue a vehicle-specifying file. When making the request to issue the vehicle-specifying file, the PC control unit 65 controls the PC communication unit 63 so as to transmit, to the first server 4, the version information on the map data received in step S53 and the authentication information received in step S48.

In step S55, the first server control unit 43 creates the vehicle-specifying file. In the vehicle-specifying file to be created, the map version is updated.

In step S56, the first server control unit 43 controls the first server communication unit 42 so as to transmit the vehicle-specifying file created in step S55 to the PC 6, together with the authentication information created in step S46.

In step S57, the PC control unit 65 controls the PC communication unit 63 so as to receive both the authentication information and the vehicle-specifying file.

In step S58, the PC control unit 65 controls the SD interface 64 so as to write both the map data received in step S53 and the vehicle-specifying file received in step S57 into the SD card 2. Then, the update process using the PC 6 ends.

<<Modifications>>

The SD card 2 is used in the present embodiment; however, a micro SD card, a nano SD card, or the like may be used instead of the SD card 2. Alternatively, for example, a universal serial bus (USB) memory or a compact disc recordable (CD-R) may be used.

In the present embodiment, upon map update using the PC 6, update map data is downloaded from the second server 5; however, the update map data may be downloaded from the first server 4. In this case, the map output system 1 does not necessarily include the second server 5.

In the present embodiment, the initial values of two or more SD cards 2 are the same; however, the initial values may be character strings related to the two or more SD cards 2.

In the present embodiment, a vehicle-specifying value is created based on vehicle-specifying information; however, it may be created based on information for use in identifying a device such as a communication device mounted in a vehicle. In this case, information on a unique value related to the vehicle is also stored in an SD card 2 that has been subjected to the vehicle lock.

In the present embodiment, a movable body equipped with the navigation device 3 is a vehicle; however, the movable body is not limited to a vehicle. Other examples of the movable body include ships and aircraft. Examples of the vehicle include cars, motorcycles, bicycles, and trains.

In the present embodiment, the navigation device 3 is configured to perform the process of the vehicle lock when the vehicle travels beyond a predetermined travel distance. If the movable body is a ship, when the ship moves beyond a predetermined length, the navigation device 3 performs the process of the vehicle lock. In short, when the movable body moves beyond a predetermined length, the navigation device 3 performs the vehicle lock. The movement herein refers to the movement of the movable body by means of power possessed by the movable body.

In the present embodiment, the usage amount is obtained based on the length over which the vehicle moves; however, the usage amount only has to be a parameter indicating that the vehicle equipped with the navigation device 3 is used on a full scale, not temporarily. Therefore, the usage amount may be obtained, for example, based on a period in which the map data is output to the output unit 31. In this case, the navigation device 3 performs the process of the vehicle lock when the map data stored in the SD card 2 is used for a certain period, namely, when the map data stored in the SD card 2 is output to the output unit 31 for a certain period. Preferably, the certain period is in a range of one hour or more and five years or less. More preferably, the certain period is in a range of 24 hours or more and three years or less. More preferably, the certain period is in a range of one month or more and six months or less.

The navigation device 3 may be configured to perform the vehicle lock when the SD card 2 is inserted into the SD host module 33. For example, if the usage amount is determined based on the period in which the map data is output to the output unit 31, the navigation device 3 is configured to perform the vehicle lock immediately after the map data is output to the output unit 31. Alternatively, the navigation device 3 may be configured to perform the vehicle lock immediately after the SD card 2 is inserted into the SD host module 33.

In the present embodiment, the map data stored in the SD card 2 is not encrypted; however, the map data may be at least partly encrypted.

In the present embodiment, the first server 4 and the second server 5 are managed by different organizations; however, they may be managed by the same organization.

In the present embodiment, when performing the vehicle lock, the navigation device 3 creates a vehicle-specifying file; however, the first server 4 may create the vehicle-specifying file, instead of the navigation device 3.

In the present embodiment, the SD card 2 prestores a vehicle-specifying file containing information on an initial value; however, the present invention is not limited to this configuration. For example, if a vehicle-specifying file containing information on a unique value is not stored in the SD card 2, the navigation device 3 may request an entry of a predetermined license key in response to the insertion of the SD card 2 into the SD host module 33, and may be activated when it is authenticated.

In the present embodiment, when performing the vehicle lock, the navigation device 3 creates a new vehicle-specifying file containing information on a unique value and overwrites a vehicle-specifying file containing information on an initial value stored in the SD card 2 with this created vehicle-specifying file. However, the present invention is not limited to this configuration. When the navigation device 3 performs the vehicle lock, the data processing unit 38 may control the SD host module 33 so as to subject the SD card 2 to a process in which information on an initial value contained in a vehicle-specifying file is changed into information on a unique value. For this purpose, the data processing unit 38 may perform a process of reading the vehicle-specifying file from the SD card 2, changing the information on the initial value stored in this vehicle-specifying file into the information on the unique value, and overwrites the vehicle-specifying file containing the information on the initial value stored in the SD card 2 with this vehicle-specifying file. Further, when the navigation device 3 performs the vehicle lock, the data processing unit 38 may be configured to additionally store the vehicle-specifying file containing the information on the unique value in the SD card 2. With this configuration, when both a vehicle-specifying file containing information on an initial value and a vehicle-specifying file containing information on a unique value are stored in the SD card 2, the navigation device 3 is configured to judge whether to be activated, based on the vehicle-specifying file containing the information on the unique value.

In the present embodiment, as illustrated in FIG. 3, the navigation device 3 performs the process of the vehicle lock when activated; however, the present invention is not limited to this configuration. For example, the navigation device 3 may be configured to perform the process of the vehicle lock in the course of guiding a route.

In the present embodiment, the navigation device 3 subjects the SD card 2 in which the map data is stored to the vehicle lock; however, the navigation device 3 may be configured to subject a storage medium in which no map data is stored to the vehicle lock. In this configuration, for example, the storage medium stores data that may be sharedly used among two or more devices.

In the present embodiment, the map output system 1 is configured to use a license file to manage an update time limit; however, it may be configured to use a vehicle-specifying file to manage the update time limit.

In the present embodiment, the navigation device 3 communicates directly with the first server 4 upon map update; however, it may be configured to communicate with the first server 4 via a mobile terminal. In this case, the navigation device 3 is preferably configured to support a smart device link (SDL) by which the navigation device 3 cooperates with a mobile terminal through short-range wireless communication. Examples of the mobile terminal include smartphones, mobile phones, tablet terminals, and laptop computers.

Figure 6:
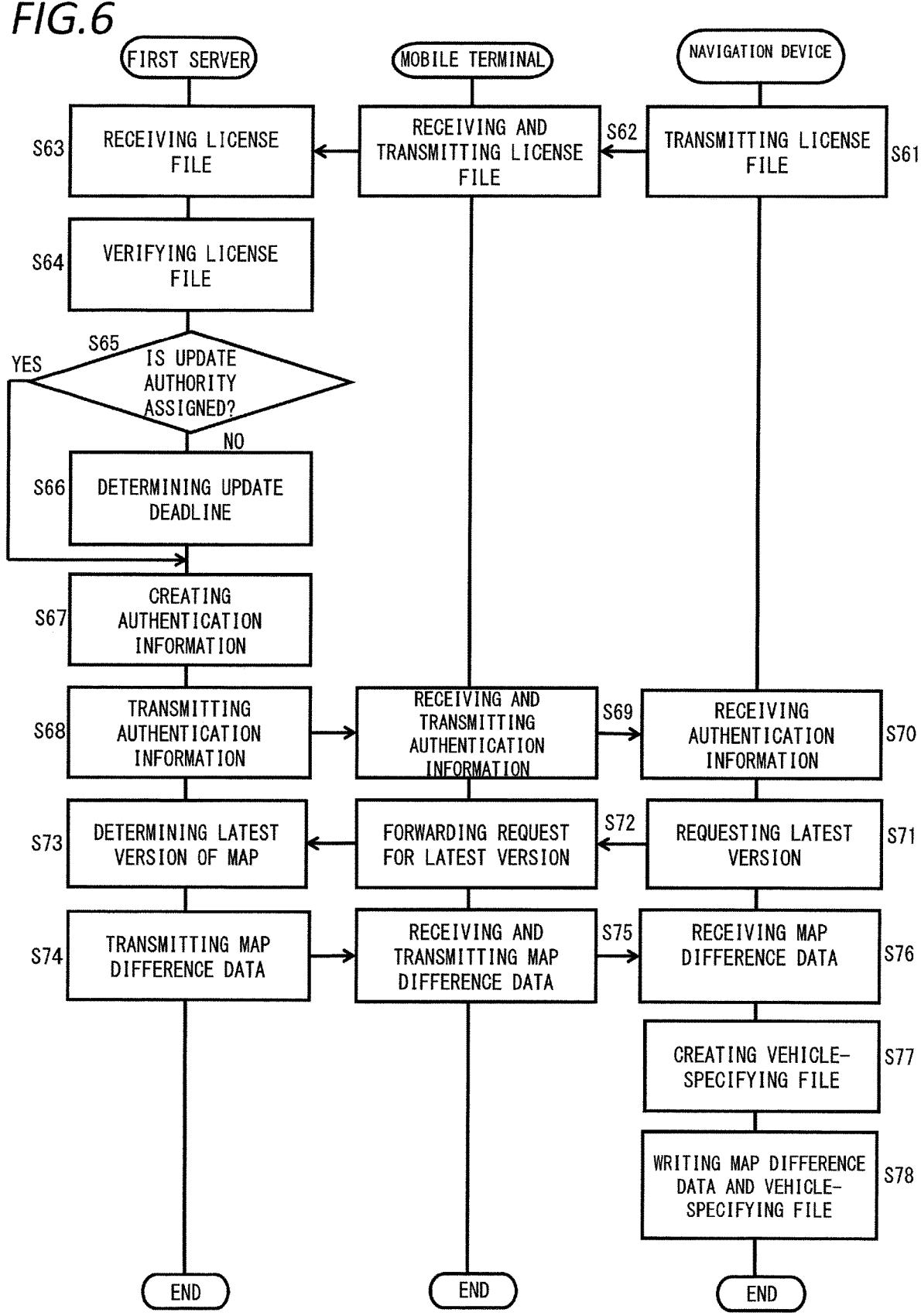
FIG. 6 is a flowchart of a process of a map update according to a modification.

FIG. 6 is a flowchart of a process of a map update according to a modification. The navigation device 3 starts the update process at a predetermined timing.

In step S61, the navigation control unit 34 controls the navigation communication unit 35 so as to transmit a license file to the mobile terminal.

In step S62, the mobile terminal receives the license file from the navigation device 3 and in turn transmits the received license file to the first server 4.

The processes in steps S63 to S67 are the same as those in steps S22 to 26 illustrated in FIG. 4.

In step S68, the first server control unit 43 controls the first server communication unit 42 so as to transmit authentication information to the mobile terminal.

In step S69, the mobile terminal receives the authentication information from the first server 4 and in turn transmits the received authentication information to the navigation device 3.

The process in step S70 is the same as that in step S28 illustrated in FIG. 4.

In step S71, the navigation control unit 34 requests the latest version.

In step S72, the mobile terminal forwards the request for the latest version to the first server 4. More specifically, the mobile terminal transmits the version information, medium-specifying information, and the authentication information to the first server 4.

The process in step S73 is the same as that in step S30 illustrated in FIG. 4.

In step S74, the first server control unit 43 controls the first server communication unit 42 so as to transmit map difference data on the map version determined in step S73 to the mobile terminal.

In step S75, the mobile terminal receives the map difference data from the first server 4 and in turn transmits the received map difference data to the navigation device 3.

The processes in steps S76 to S78 are the same as those in steps S32 to 34 illustrated in FIG. 4. Then, the update process using the mobile terminal ends.

<<Example of Implement with Hardware>>

Figure 7:
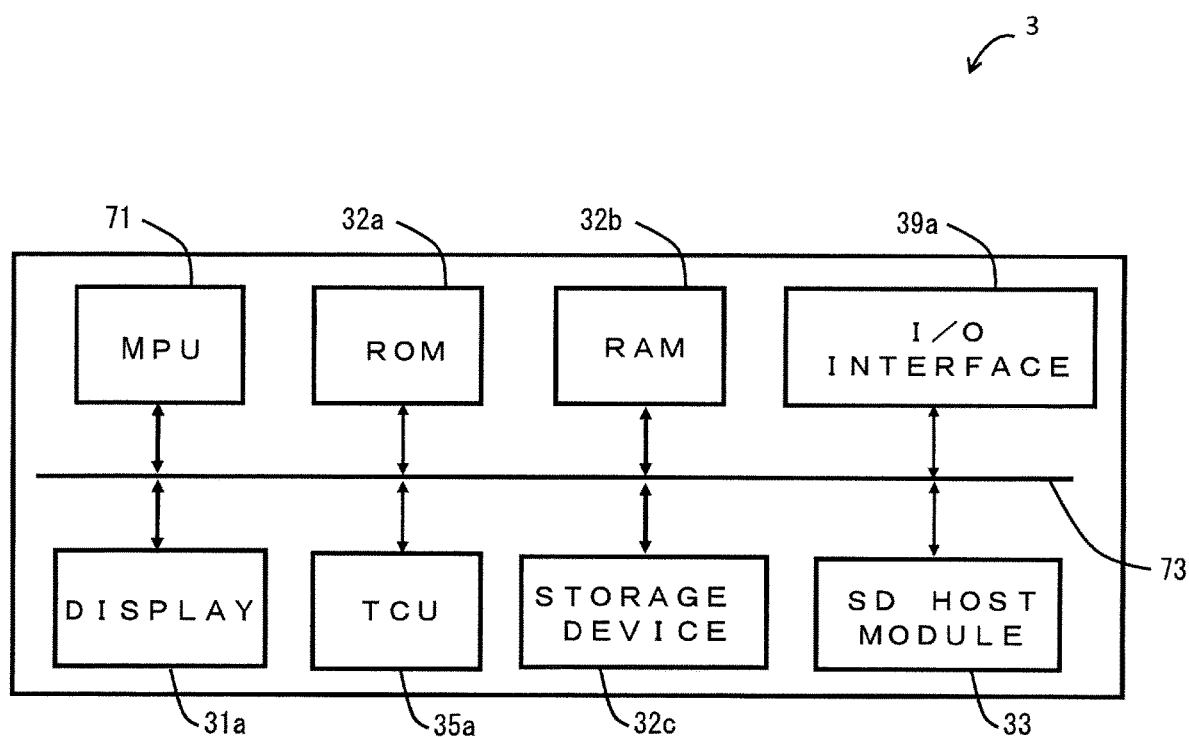
FIG. 7 is a block diagram illustrating an example of a hardware configuration of the navigation device according to the present embodiment.

FIG. 7 is a block diagram illustrating an example of a hardware configuration of the navigation device 3 according to the present embodiment.

The navigation device 3 includes an MPU 71, read only memory (ROM) 32a, random access memory (RAM) 32b, an I/O interface 39a, a display 31a, a TCU 35a, a storage device 32c, and an SD host module 33.

The MPU 71 functions as both an arithmetic processing unit and a control unit. The MPU 71 controls an overall operation of the navigation device 3 in accordance with various programs. The MPU 71 executes various programs stored in the ROM 32a by using the RAM 32b as a work area.

The ROM 32a stores programs to be used by the MPU 71, operational parameters, and the like.

The RAM 32b temporarily stores a program to be used by the MPU 71 to execute control. In addition, for example, the RAM 32b temporarily stores parameters that appropriately change when the MPU 71 executes the control.

The I/O interface 39a reads data for travel distance information, vehicle-specifying information, and the like from various car navigation sensors and input and output devices provided in the vehicle and then provides the read data to the MPU 71 via the RAM 32b.

The TCU 35a communicates with the first server 4.

The storage device 32c is implemented by, for example, a magnetic storage device, a semiconductor storage device, an optical storage device, and a magneto-optical storage device. A magnetic storage device is, for example, a hard disk drive (HDD). The storage device 32c stores programs to be executed by the MPU 71, various types of data, and various types of data acquired from the outside, for example.

The SD host module 33 reads/writes information from or into an inserted SD card 2. The SD host module 33 outputs the information read from the SD card 2 to the RAM 32b.

All of the MPU 71, the ROM 32a, the RAM 32b, the I/O interface 39a, the display 31a, the TCU 35a, the storage device 32c, and the SD host module 33 are interconnected via a bus 73.

The MPU 71 acquires the travel distance information via the I/O interface 39a, for example, and outputs the travel distance information to the RAM 32b. The MPU 71 judges whether the travel distance information exceeds a predetermined value and, when judging that the travel distance information exceeds the predetermined value, creates a vehicle-specifying file based on the vehicle-specifying information acquired via the I/O interface 39a. The MPU 71 stores the vehicle-specifying file in the SD card 2 via the SD host module 33. In this way, the vehicle lock is performed.

A hardware configuration of each of the first server 4, the second server 5, and the PC 6 is also substantially the same as that of the navigation device 3 except for the I/O interface 39a and the like.

It should be noted that the present invention is not limited to the foregoing embodiments, and various modifications are possible within the scope of the claims. In addition, embodiments obtained by appropriately combining technical means disclosed in the modifications also fall within the technical scope of the present invention.

What is claimed is:

1. A map output device mounted in a movable body, the device comprising:
   a connection unit having one or more terminals that are electrically connected to one or more terminals of a storage medium in which map data is stored, to exchange data;
   a display that outputs the map data; and
   a control circuit that individually controls the connection unit and the display,
   wherein the control-circuit is configured, when the movable body is used beyond a predetermined usage amount corresponding to a travel distance of the moving body,
   to generate a file containing information on a unique value after the map data has been stored in the storage medium and store the unique value within the storage medium, the unique value being a character string, related to the movable body into the storage medium connected to the connection unit and
   to output, to the display, the map data read from the storage medium in which the file containing the information on the unique value related to the movable body is stored.

2. The map output device according to claim 1, wherein the usage amount is obtained based on a length over which the movable body has moved or based on a period in which the map data is output to the display.

3. The map output device according to claim 2,
   wherein the storage medium prestores a file containing information on an initial value, the initial value being any character string, and
   wherein the control circuit is configured
      to read the map data also from the storage medium in which the file containing the information on the initial value is stored, and
      to, when the storage medium is connected to the connection unit or when the movable body is used beyond a predetermined usage amount, overwrite the file containing the information on the initial value stored in the storage medium with the file containing the information on the unique value.

4. The map output device according to claim 3,
   wherein each of the file containing the information on the initial value and the file containing the information on the unique value further contains version information indicating a version of the map data, and
   wherein the control circuit is configured to, when the map data stored in the storage medium is updated, write, into the storage medium, a file containing the information on the initial value or the unique value and the version information on the updated map data.

5. A map output system comprising:
   a map output device mounted in a movable body; and
   a server,
   the map output device including:
   a connection unit having one or more terminals that are electrically connected to one or more terminals of a storage medium in which map data is stored, to exchange data;
   a display that outputs the map data; and
   a control circuit that individually controls the connection unit and the display,
   wherein the control circuit is configured, when the movable body is used beyond a predetermined usage amount corresponding to a travel distance of the moving body,
   to generate a file containing information on a unique value after the map data has been stored in the storage medium and store the unique value within the storage medium, the unique value being a character string, related to the movable body and version information indicating a version of the map data into the storage medium connected to the connection unit and to output, to the display, the map data read from the storage medium in which the file containing the information on the unique value and the version information is stored, and wherein the server is configured to, when the map data stored in the storage medium is updated, create a file containing the version information on the updated map data and the information on the unique value.

6. The map output system according to claim 5, wherein the server further includes a storage unit that stores a predetermined encryption key, and wherein the server is configured to, when the map data stored in the storage medium is updated, encrypt the file containing the version information on the updated map data and the information on the unique value, based on the encryption key.

7. The map output system according to claim 5, wherein the storage medium prestores a file containing information on an initial value, the initial value being any character string, and the version information, wherein the control circuit is configured to read the map data also from the storage medium in which the file containing the information on the initial value is stored, and wherein the server is configured to, when the map data stored in the storage medium is updated, create a file containing the version information on the updated map data and the information on the initial value.

8. The map output system according to claim 5, wherein the storage medium prestores medium-specifying information for use in distinguishing the storage medium from other storage media, wherein the control circuit is configured to, when the storage medium is connected to the connection unit, write, into the storage medium, a license file containing the version information on the map data stored in the storage medium and the medium-specifying information, and wherein the server is configured to determine a time limit until which update of the map data stored in the storage medium is allowed, using the medium-specifying information and the version information contained in the license file.

9. A computer-readable storage medium including a program causing a computer, mounted in a movable body, that includes a connection unit having one or more terminals that are electrically connected to one or more terminals of a storage medium in which map data is stored, to exchange data, a display that outputs the map data, and a control circuit that individually controls the connection unit and the display, to:

when the movable body is used beyond a predetermined usage amount corresponding to a travel distance of the moving body, generate a file containing information on a unique value after the map data has been stored in the storage medium and store the unique value within the storage medium, the unique value being a character string, related to the movable body into the storage medium connected to the connection unit; and output, to the display, the map data read from the storage medium in which the file containing the information on the unique value, the unique value being a character string, related to the movable body is stored.

* * * * *